United States Patent
Raith (10) Patent No.: US 6,625,457 B1
(45) Date of Patent: Sep. 23, 2003

(54) MOBILE TERMINAL WITH LOCATION DATABASE

(75) Inventor: Alex Krister Raith, San Diego, CA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/546,720

(22) Filed: Apr. 11, 2000

(51) Int. Cl.⁷ ................................................ H04Q 7/20
(52) U.S. Cl. ...................... 455/456.1; 455/457; 340/991
(58) Field of Search ..................... 455/456.1, 457, 455/466, 564, 919, 414, 418, 79, 550; 701/200, 201, 207, 208, 209; 340/990, 991, 993, 455, 456.3, 922, 907, 903

(56) References Cited

U.S. PATENT DOCUMENTS

| | | | | |
|---|---|---|---|---|
| 5,559,520 A | * | 9/1996 | Barzegar et al. | 342/357.1 |
| 5,625,668 A | * | 4/1997 | Loomis et al. | 455/456 |
| 5,748,899 A | * | 5/1998 | Aldrich | 709/222 |
| 5,790,974 A | * | 8/1998 | Tognazzini | 455/456 |
| 5,809,494 A | * | 9/1998 | Nguyen | 707/1 |
| 5,938,721 A | * | 8/1999 | Dussell et al. | 701/211 |
| 6,091,956 A | * | 7/2000 | Hollenberg | 455/456 |
| 6,282,426 B1 | * | 8/2001 | Wang | 455/456 |
| 6,385,465 B1 | * | 5/2002 | Yoshioka | 455/564 |

OTHER PUBLICATIONS

GB002308946A Worsnop et al. Channel Allocation for Registering in a Cellular Radio Network.*

* cited by examiner

Primary Examiner—William Trost
Assistant Examiner—Congvan Tran
(74) Attorney, Agent, or Firm—Coats & Bennett, P.L.L.C.

(57) ABSTRACT

A mobile terminal includes a positioning receiver and a memory containing a location database. The location database defines a plurality of different geographic areas and contains location specific information pertaining to defined geographic areas. Selected location specific information corresponding to a particular geographic area is output based on the current location of the mobile terminal.

2 Claims, 9 Drawing Sheets

MOBILE TERMINAL WITH LOCATION DATABASE

BACKGROUND OF THE INVENTION

The present invention relates generally to mobile communication devices, such as cellular telephones and, more particularly, to a mobile communication device having a location database for storing location specific information that can be retrieved and displayed based on the current location of the mobile communication device.

Mobile terminals, such as cellular telephones and personal digital assistants, are in widespread use. One reason for the popularity of mobile terminals is that such devices free the user from tethers to fixed communication networks and allow the user to remain in communication with others while traveling about freely. For this reason, mobile terminals are particularly popular among persons who travel frequently between different geographic areas.

Mobile terminal users traveling between different geographic areas frequently need information about the geographic area in which they are currently located. For example, a mobile terminal user may need information such as a local travel agency telephone number, location of the nearest post office, or currency exchange rate. This information may not be readily available to the mobile terminal user. Often times, the time used to locate or obtain the needed information could be spent more productively performing other tasks.

The patent to Loomis et al, U.S. Pat. No. 5,625,668, discloses a locating system for a mobile terminal having a Global Positioning System (GPS) receiver. The mobile terminal transmits latitude, longitude, and bearing information to a data processing facility in a mobile communication network. The data processing facility processes the latitude, longitude, and bearing information and converts such information into terms useful to a lay person, such as a street address. Either spoken or digital information about the current location of the mobile terminal is then transmitted back to the mobile terminal.

One drawback to the locating system described in Loomis is that it uses a data processing facility located in the mobile communication network. To obtain needed information, the mobile terminal must initiate a communication session with the network. Communication with the fixed network to obtain needed information requires a significant amount of signaling overhead and uses bandwidth that could be used for other purposes. Additionally, if the mobile terminal is for some reason unable to communicate with the network, the user would have no way of obtaining the needed information.

Accordingly, there is a need for a more convenient way to obtain needed information about the current location of the user; one that does not require a dedicated transaction with the network and that minimizes the use of the available bandwidth.

SUMMARY OF THE INVENTION

The present invention relates to a mobile terminal having a location database for storing location specific information. Location specific information pertaining to predefined coordinate positions or geographic areas is also stored in the location database. The mobile terminal also includes a positioning receiver for determining the current location of the mobile terminal. Location specific information is retrieved from the location database based on the current location of the mobile terminal. The location specific information is then displayed or otherwise output for use by the mobile terminal user.

Location specific information may be displayed at all times, when requested by a user, or when a change of location is detected. If memory constraints are a concern, an adaptive scheme can be employed to update the location database. The location database can be updated based on travel history, call history, current location, or some combination of these factors. For example, information about areas that have not been visited can be discarded to make room for information about other areas or to store higher resolution data for areas previously visited. Information needed to update the location database can be downloaded by the mobile terminal from the mobile communication network.

In another aspect of the invention, the current location of the mobile terminal may be used to update location specific features of the mobile terminal. For example, the mobile terminal may include pre-programmed buttons to dial specified numbers, such as the local emergency authorities, local law enforcement officials, hospitals, etc. As the mobile terminal moves from one jurisdiction or area to another, the local telephone numbers for various agencies or businesses will likely change. According to the present invention, the location specific functions are automatically reprogrammed as needed without user intervention when a change in location is detected.

DETAILED DESCRIPTION OF THE INVENTION

Figure 1:
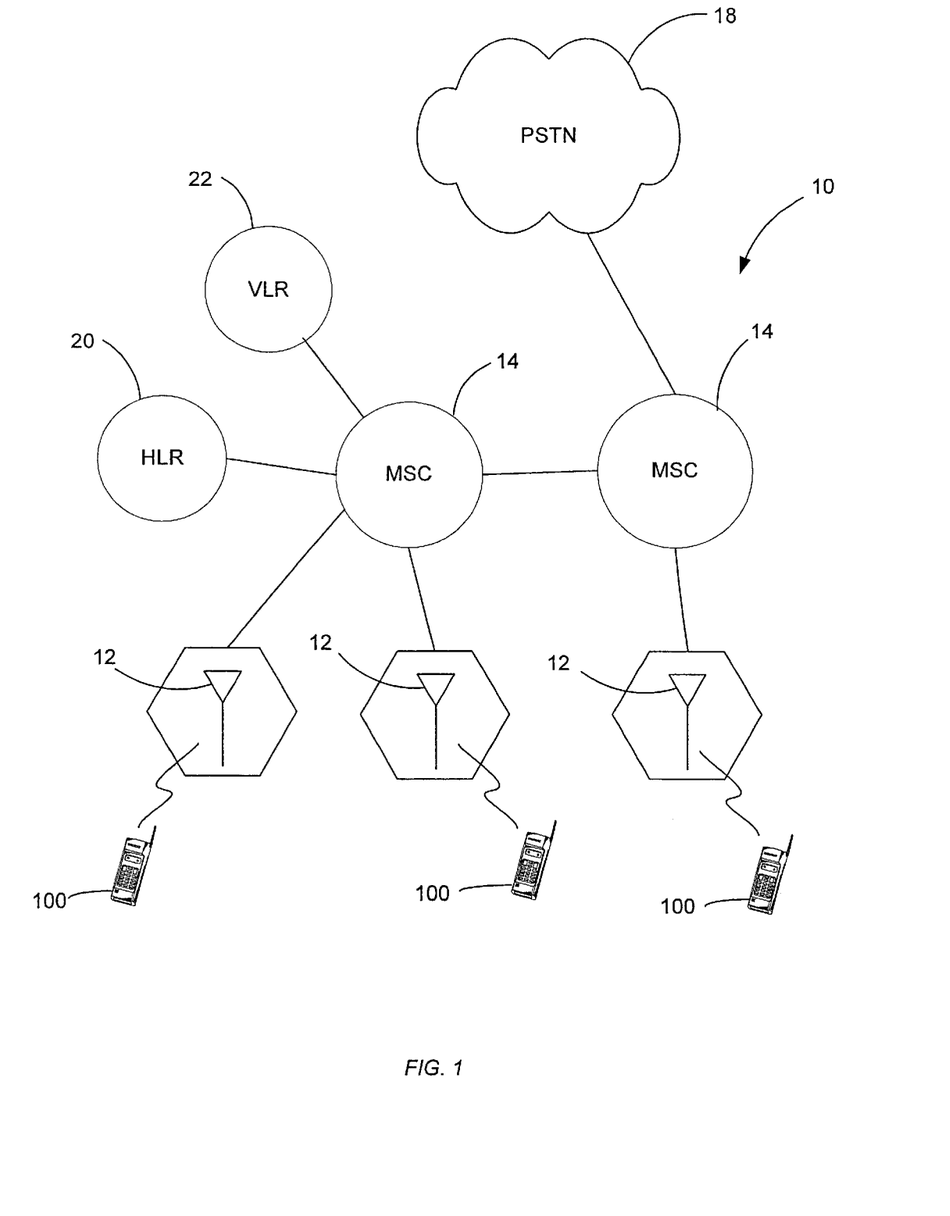
FIG. 1 is a block diagram illustrating a typical mobile communication network.

FIG. 1 illustrates the architecture of a typical circuit-switched mobile communication network, which is indicated generally by the numeral 10. The mobile communication network 10 comprises a plurality of base stations 12 which are connected via a mobile services switching center (MSC) 14 to a terrestrial communication network, such as the Public Switched Telephone Network (PSTN) 18. Each base station 12 is located in, and provides service to, a geographic region referred to as a cell. In general, there is one base station 12 for each cell within a given network 10. Within each cell, there may be a plurality of mobile terminals 100 that communicate via radio link with the base station 12. The base station 12 allows the user of the mobile terminal 100 to communicate with other mobile terminals 100, or with users connected to the PSTN 18. The MSC 14 routes calls to and from the mobile terminal 100 through the appropriate base station 12. Information concerning the location and activity status of mobile terminals 100 is stored in a Home Location Register (HLR) 20 and a Visitor Location Register (VLR) 22, which are connected to the MSCs 14. Examples of circuit-switched networks include the Global System for Mobile Communication (GSM) systems, Time Division Multiple Access (TDMA) systems such as TIA/EIA-136 systems, Code Division Multiple Access (CDMA) systems such as TIA/EIA-95 systems, Wideband Code Division Multiple Access (W-CDMA) systems, satellite systems such as Globestar and Iridium, and future systems such as CDMA 2000. Additionally, the present invention may be used in packet-switched networks (not shown), which may use, for example, the General Packet Radio Service (GPRS) protocol or Internet Protocol (IP).

Figure 2:
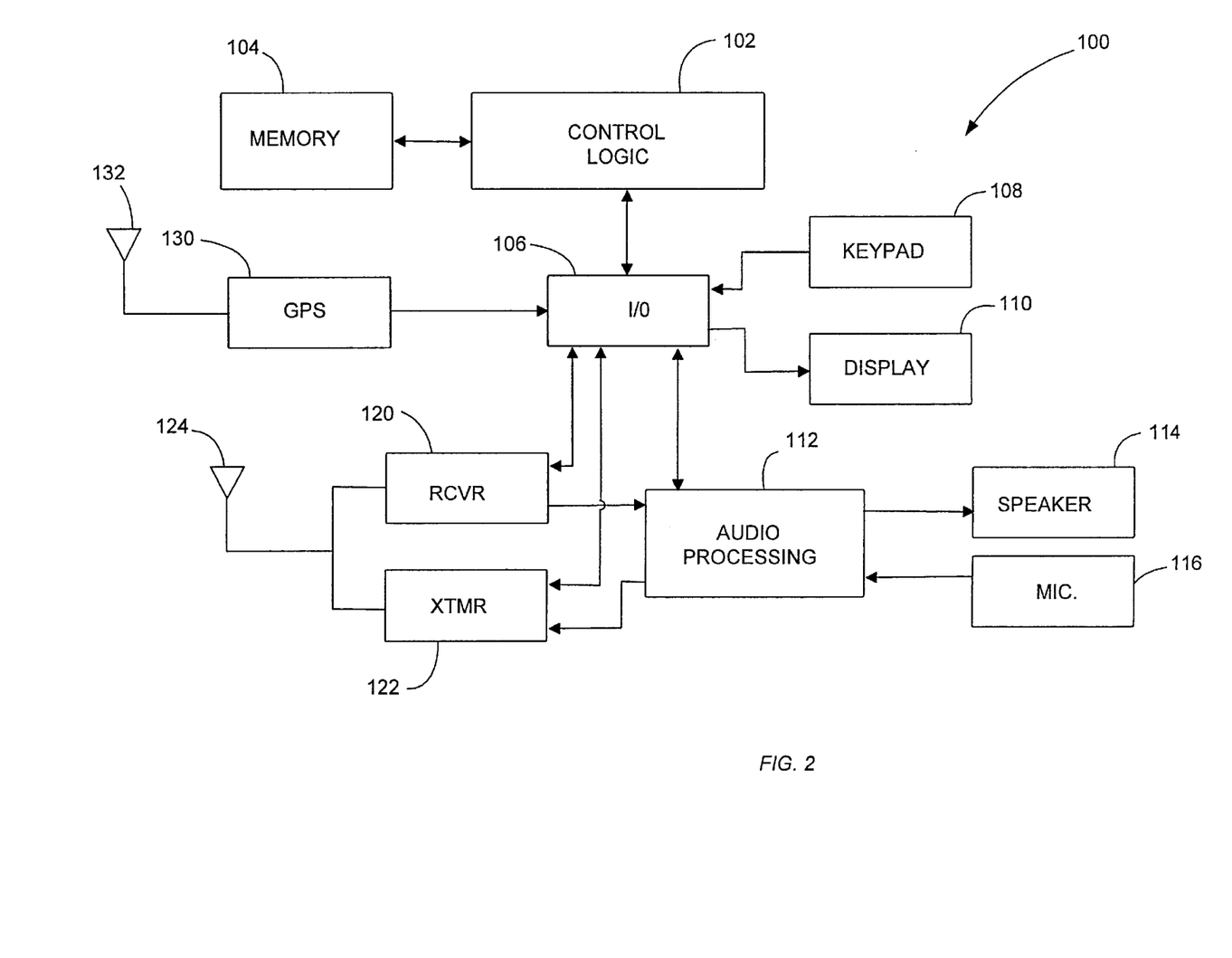
FIG. 2 is a block diagram illustrating a mobile terminal in the mobile communication network of FIG. 1.

FIG. 2 is a block diagram of an exemplary mobile terminal 100. The mobile terminal 100 is a fully functional cellular telephone, such as a TIA/EIA-136 compliant cellular telephone, capable of transmitting and receiving signals. The mobile terminal 100 includes a main control logic 102 for controlling the operation of the mobile terminal 100 and memory 104 for storing control programs and data used by the mobile terminal 100 during operation. Input/output circuits 106 interface the main control unit 102 with keypad 108, display 110, audio processing circuits 112, receiver 120, transmitter 122, and positioning receiver 130. The keypad 108 allows the operator to dial numbers, enter commands, and select options. The display 110 allows the operator to see dialed digits, stored information, and call status information. The audio processing circuits 112 provide basic analog audio outputs to a speaker 114 and accept analog audio inputs from a microphone 116. The receiver 120 and transmitter 122 receive and transmit signals using shared antenna 124.

The positioning receiver 130, which may, for example, comprise a Global Positioning System (GPS) receiver, enables the mobile terminal 100 to determine its current location based on positioning signals transmitted by a GPS satellite. In the disclosed embodiment, the GPS receiver 130 includes a separate antenna 132, but could alternatively share an antenna with the receiver 120 and/or transmitter 122. Also, in lieu of GPS receiver 130, the mobile communication network 10 could determine the location of the mobile terminal 100 and transmit the location to the mobile terminal 100. Position information could be transmitted when the mobile terminal 100 powers up, at periodic intervals, or upon request by the mobile terminal 100. Additionally, the mobile terminal 100 could determine a rough location based on information, such as the base station ID, that is transmitted by the base station 12 to the mobile terminal 100. In systems that do not broadcast a unique worldwide base station ID, it may still be possible to identify the base station by a combination of factors. For example, a base station ID in combination with a country code or system operator code may be sufficient to uniquely identify a particular base station 12 and, from that, determine a current mobile terminal 100. Of course, other factors may also be used to uniquely identify the base station 12 depending on the particular system being used.

According to the present invention, a location database is stored in memory 104 of the mobile terminal 100. The location database stored in memory 104 contains location specific information related to pre-defined positions or geographic areas in the location database. Examples of location specific information include local emergency telephone numbers (e.g., police, fire, ambulance), local time, local language dictionary, local currency exchange rates, telephone numbers for public transportation (e.g., taxis, buses, train, airports), and telephone numbers for public facilities or accommodations (post offices, hotels, restaurants). This list is not intended to be exclusive but merely illustrates the types of location specific information that can be stored. Location specific information may comprise any information that changes based on current location of the mobile terminal 100. Also, location specific information may include graphic images associated with a particular location. For example, a graphic image of a flag or map of a country may be displayed to indicate the country for the current location.

Location specific information stored in the location database is associated with a location data, such as a coordinate position or a defined geographic area. When location specific information is requested by the user of the mobile terminal 100, or by an application running on the mobile terminal 100, the location database is queried to return the desired information based on the current location of the mobile terminal 100. For example, if the user requests a list of hotels in the locality of the mobile terminal 100, the mobile terminal 100 could query the location database to return a list of hotels and then reduce the list by comparing the associated location data with the current location of the mobile terminal 100. A list of hotels within a predetermined distance (which could be programmed) of the current location of the mobile terminal 100, or within the same geographic area, would be sent to the display 110. The particular manner in which the information is retrieved is not a material aspect of the invention. The important part is that location specific information is associated in some manner with location data that can be compared to the current location of the mobile terminal 100.

Figure 9:
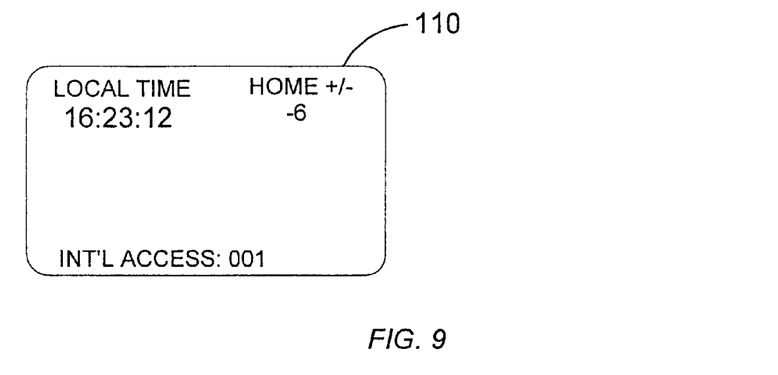
FIGS. 9–11 are illustrations showing various formats for displaying location specific information.
Figure 10:
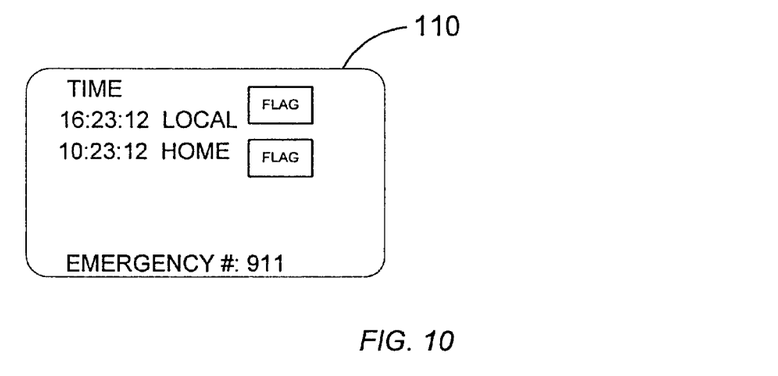
Figure 11:
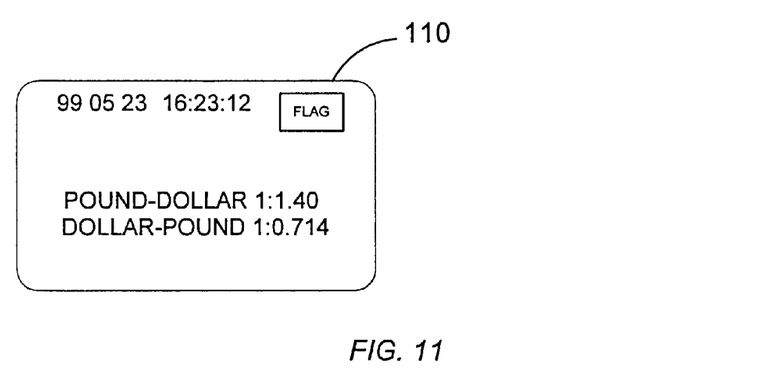

FIGS. 9, 10, and 11 show various displays, which are meant to be illustrative of the manner of displaying information to the user. In FIG. 9, the local time at the current location of the mobile terminal 100 is displayed. The number beside the local time indicates the time difference between the local time and the current time in the user's home territory. The International Access Code is displayed along the bottom of the display 110. FIG. 10 shows a different format for displaying time. In FIG. 10, both the local time and the time in the user's home territory are displayed. An image of a flag is displayed beside both time indications to indicate the area pertaining to each time indication. The local emergency number is displayed at the bottom of the display 110. In FIG. 11 the date and time are displayed at the top of the display 110, along with a time difference between the time in the current location and the time in the user's home territory. Currency exchange rates are displayed below the time indications to indicate the rate of exchange between currency in the local area and the user's home currency. Those skilled in the art will recognize that many other formats could be used. These illustrations exemplify how information can be formatted and are not to be construed as limiting.

The location data in the location database, as previously mentioned, may reference pre-defined geographic areas, referred to as area definitions, stored in the mobile terminal 100, either as part of the location database or as part of some other database. The defined geographic areas may, for example, comprise countries, states, counties, cities, or other useful geographic areas. The geographic areas defined in the location database may include sub-areas. For example, the areas defined may include countries, the states or provinces within each country, and the counties within each state or province. The geographic areas defined by the location database do not, however, need to correspond to political boundaries. Further, it is important to note that the geographic areas do not have to be distinct. That is, geographic areas defined by the location database may overlap one another, or even be wholly included in another geographic area.

The location database, which contains location data and location specific information, may be loaded into memory 104 by the manufacturer or seller prior to initial activation of the mobile terminal 100, downloaded over the air from the mobile communication network 10 into memory 104 following activation, or entered by the end user, such as by using an application program running on a personal computer that interfaces with the mobile terminal 100. The location database could also be contained in a removable memory device, such as a smart card, that can be inserted into the mobile terminal 100 and later replaced. The end user could also input location specific information using the keypad 108 and display 110. Other types of input devices could also be used including various types of pointing devices, and voice recognition.

Location specific information may be displayed at all times, when requested by the user, when predetermined criterion related to change of position is met, or some combination of these methods.

Figure 3:
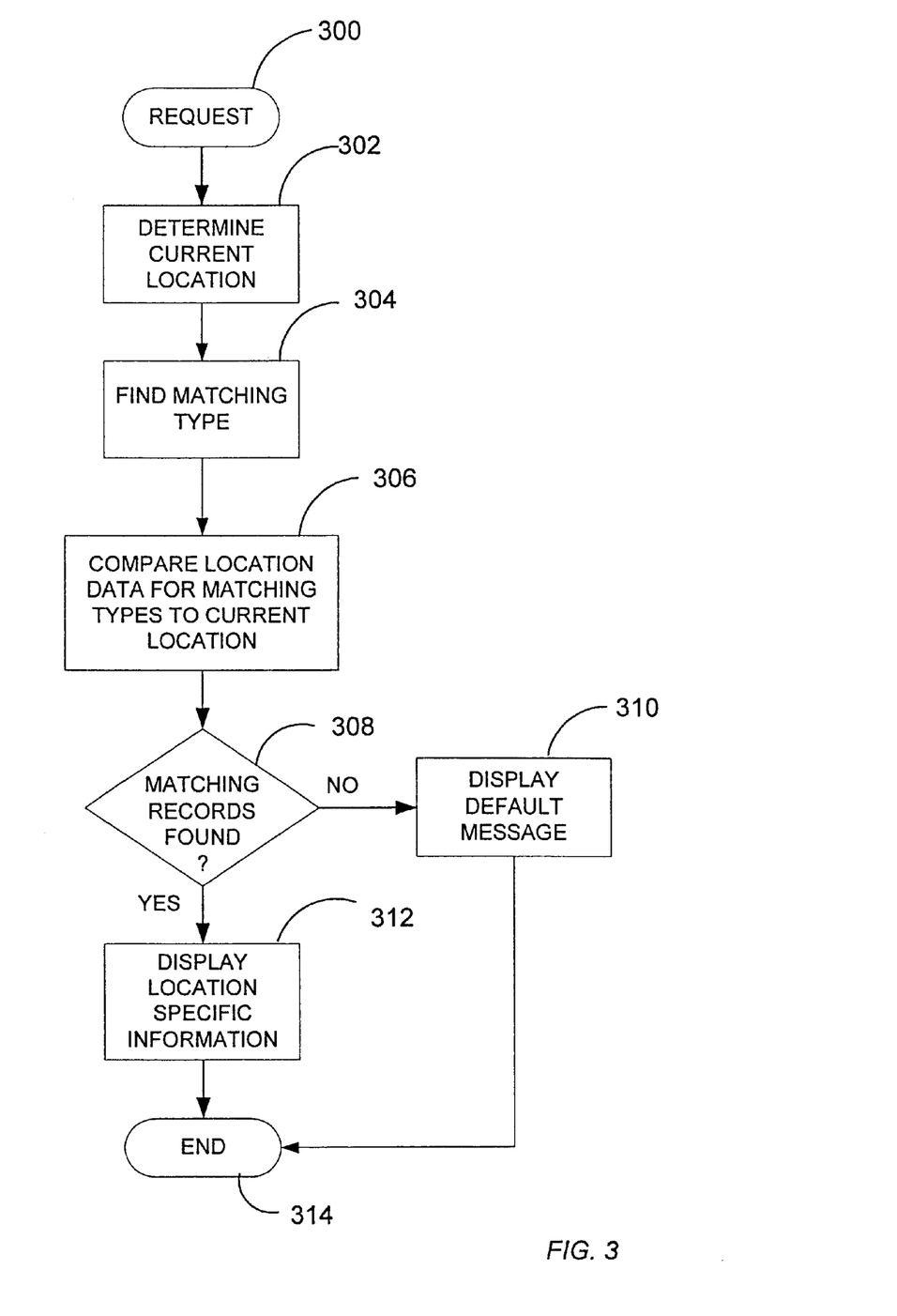
FIG. 3 is a flow diagram of a procedure for displaying location specific information in response to a user request.

FIG. 3 illustrates a procedure for displaying location specific information upon request by the user. When a request for location specific information is made (block 300), the mobile terminal 100 determines its current location (block 302) and searches the database for information of the requested type (block 304), if a particular type of information is specified. The mobile terminal 100 then compares the current location of the mobile terminal 100 to the location data corresponding to the information of interest (block 306). If no information is found matching the current location of the mobile terminal 100 (block 308), a default message may be displayed (block 310) indicating that the requested information is not available for the current location of the mobile terminal 100. If location specific information is found matching the current geographic location of the mobile terminal (block 308), the mobile terminal 100 displays the matching information on the mobile terminal's display 110 (block 312). Alternatively, the information could be output in audible form through the mobile terminal's speaker 114. The procedure ends (block 314) when the requested information is displayed.

Figure 4:
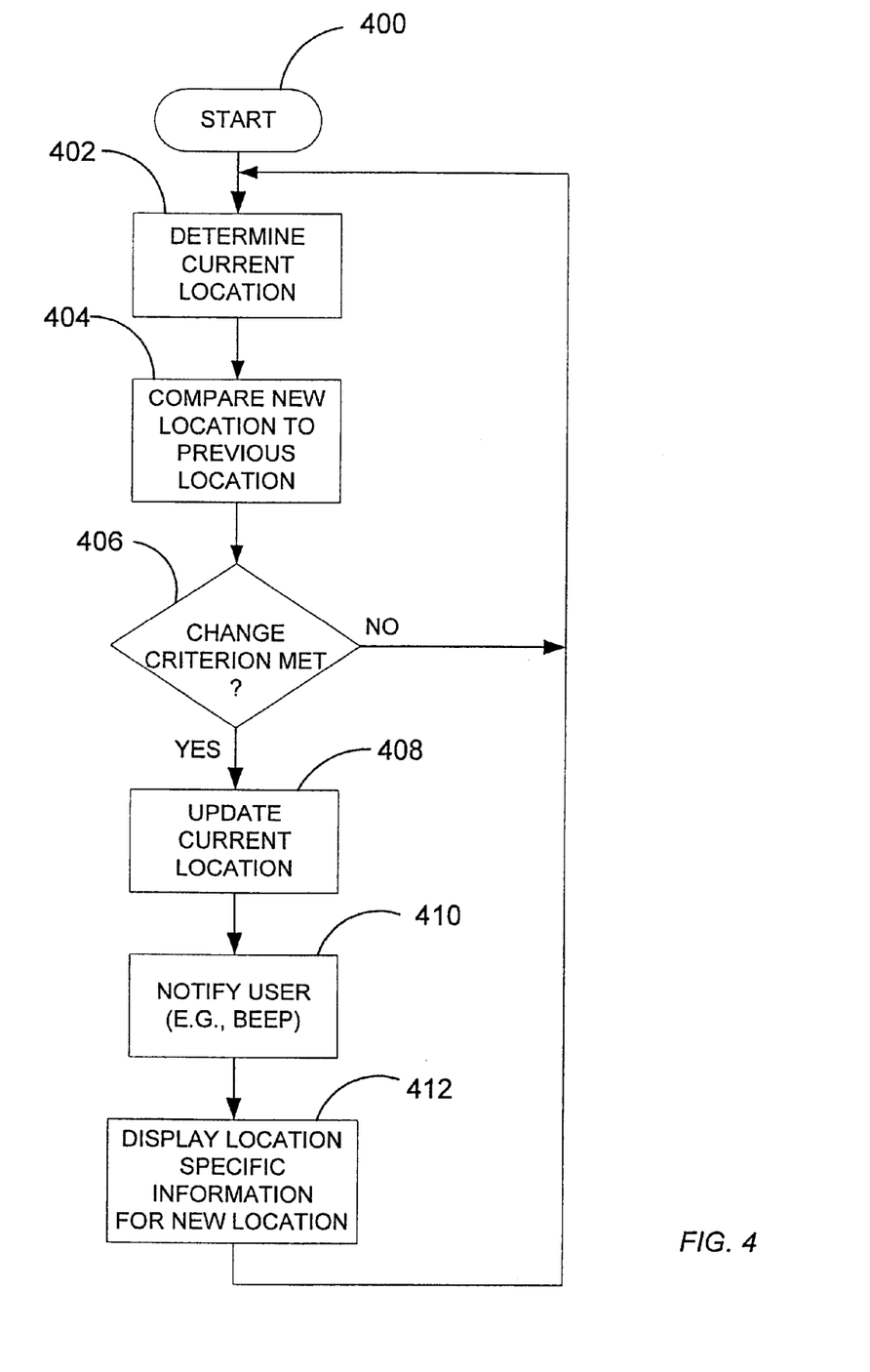
FIG. 4 is a flow diagram of a procedure for displaying location specific information in response to a change in geographic areas.

FIG. 4 illustrates a procedure that displays location specific information in response to a change in the position of the mobile terminal 100. The procedure may be started automatically by an initialization procedure when the mobile terminal 100 is first turned on or may be started manually by the user (block 400). The mobile terminal 100 periodically determines its current location (block 402). After determining its current location, the mobile terminal 100 compares its new location to a previous location, which may be stored in memory (block 404), and determines whether predetermined change criterion has been met (block 406). The change criterion may simply be a distance threshold from a previously stored location, or may be a change from one defined geographic area to another, if area definitions are used. The particular change criterion is not material. If the change criterion is met (block 406), the mobile terminal 100 updates its current location (block 408) and then notifies the user of the change, for example, by beeping (block 410). Location specific information for the current location of the mobile terminal 100 is then retrieved from memory 104 and displayed (block 412). The display of location specific information may be automatic or, alternatively, may be conditioned on the user's response to a prompt or some other event. For example, mobile terminal 100 may be programmed to display a prompt when a change in position is detected. The prompt may, for example, identify the new position and ask the user whether to display corresponding location specific information. Location specific information would then be displayed based on the user's response to the prompt. Preferably, the user may select the type of location specific information that is displayed. Such selection can be made through a menu system that allows the user to customize mobile terminal 100 operation and set desired options.

Figure 5:
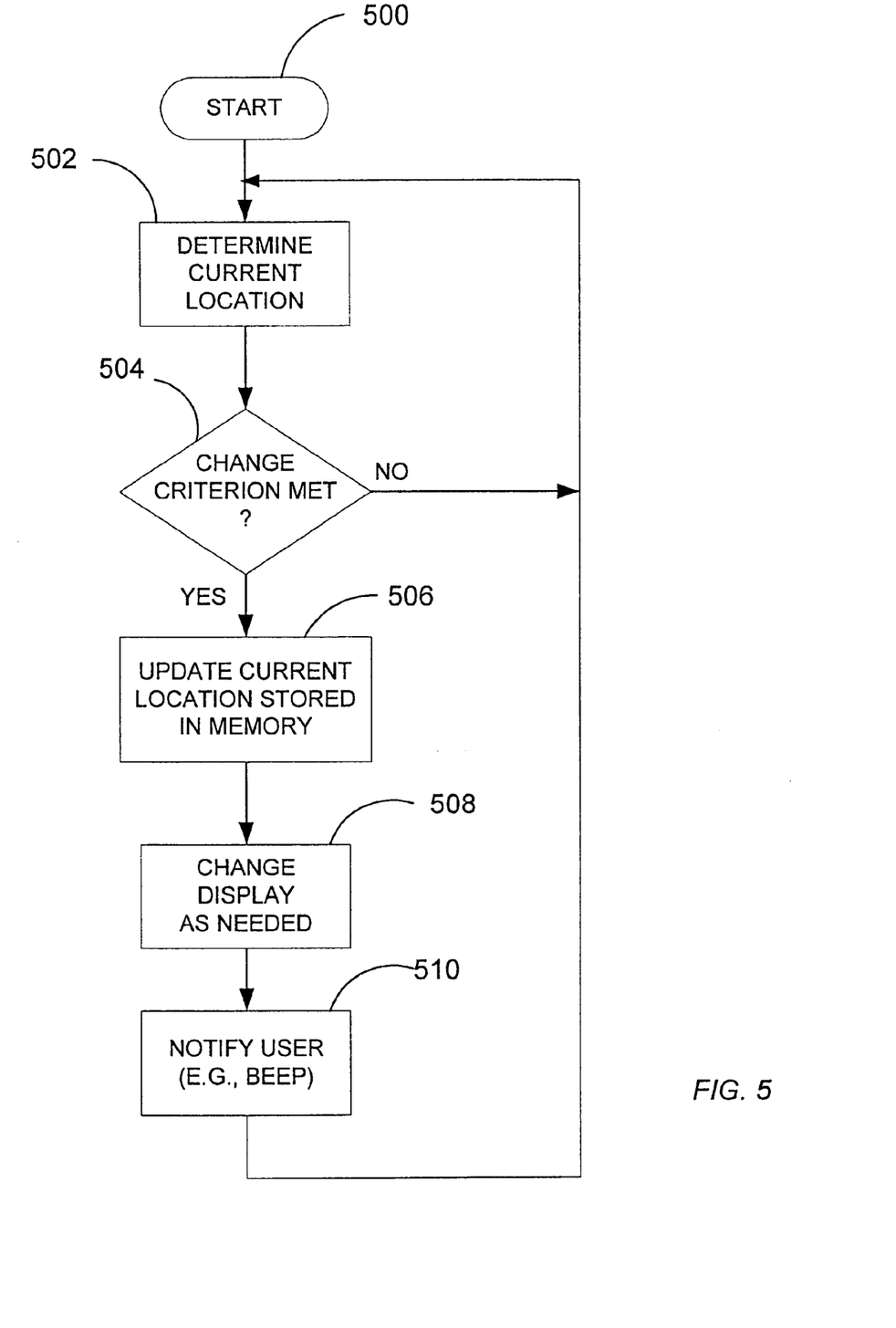
FIG. 5 is a flow diagram of a procedure for updating the display of location specific information when a change in geographic area is detected.

It may be desirable to display some location specific information at all times or on some periodic basis. For example, some mobile terminals 100 display the current time which may change depending on the time zone. In such cases, it is necessary to update the display based on the current location of the mobile terminal 100. FIG. 5 illustrates a procedure for updating location specific information that is displayed at all times or on some periodic basis. The procedure preferably starts (block 500) whenever location specific information is displayed. Once started, the mobile terminal 100 periodically determines its current location (block 502). After determining its current location, the mobile terminal 100 compares its current location to a previously-stored location and determines whether predefined change criterion has been met (block 504). If so, the mobile terminal 100 updates the current location stored in memory 104 (block 506) and then changes the display 110 as needed (block 508). If the information displayed changes, the user may be alerted to the change by a beep or some other indication (block 510).

The amount of memory 104 needed to practice the invention will depend on the extent of the geographic area covered by the location database and the resolution of the coordinate positions or geographic areas in the coverage area. As memory technology advances, concerns about the amount of memory 104 will disappear. Thus, it is expected that the coverage area of the location database may extend throughout the entire world. If memory requirements are a concern, an adaptive scheme can be employed wherein location specific information about geographic areas not visited can be discarded. The memory 104 made available by discarding location specific information concerning unvisited geographic areas can then be used to store higher resolution data for previously visited areas, or to store location specific information about other geographic areas that are more likely to be visited.

Figure 6:
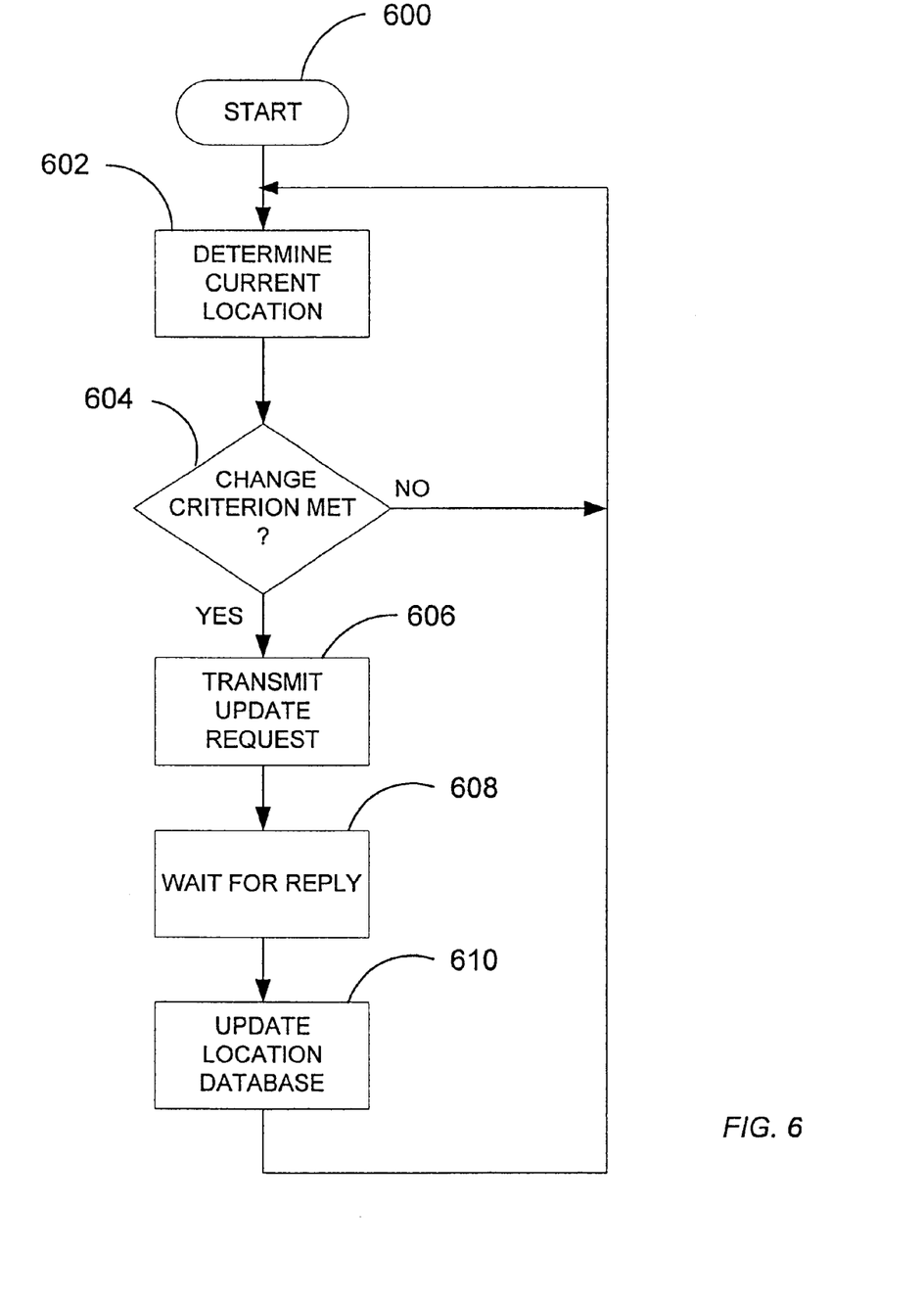
FIG. 6 is a procedure for updating the location database based on the current location of the mobile terminal.

Another adaptive scheme to minimize the size of the location database would be to dynamically update the location database stored in memory 104 as the location of the mobile terminal 100 changes, e.g. the mobile terminal 100 moves from one area to another area. FIG. 6 shows a procedure for dynamically updating the location database based on the changing location of the mobile terminal 100. The procedure may start when the mobile terminal 100 is first turned on or may be manually activated by the user (block 600). Once started, the mobile terminal 100 periodically determines its current location (block 602). Each time the current location is determined, the mobile terminal 100 determines whether pre-defined change criterion has been satisfied (block 604). If so, the mobile terminal 100 transmits an update request to the mobile communication network 10 (block 606). The mobile terminal 100 then waits for a response from the mobile communication network (block 608), and then updates the location database with the new information after a response is received (block 610). If memory constraints are a problem, the mobile terminal 100 may delete location specific information that has not been recently accessed. Preferably, location specific information would be deleted based on some criterion such as frequency of use, distance, travel history, or call history, rather than at random, so that information likely to be needed is not deleted.

Figure 7:
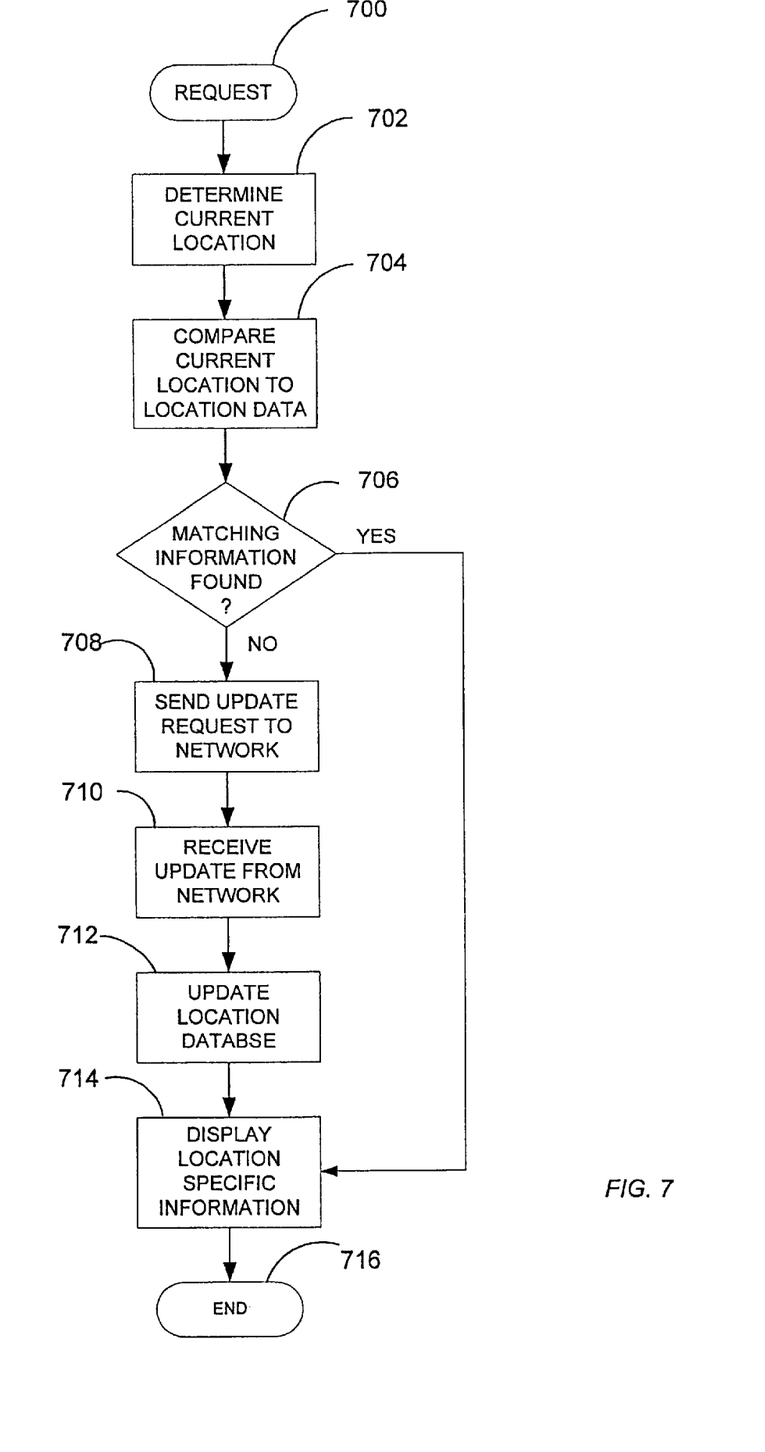
FIG. 7 is a flow diagram of a procedure for displaying location specific information in response to user requests which includes automatic updating of the location database.

FIG. 7 shows a procedure similar to the procedure of FIG. 3, which incorporates dynamic updating of the location database. When a request for location specific information is made (block 700), the mobile terminal 100 determines its current location (block 702) and compares the current location to the location data contained in the location database (block 704) as previously described. If location specific information corresponding to the current location is found, the mobile terminal 100 displays the requested information for viewing by the user (block 714). If no location-specific information corresponding to the current location of the mobile terminal 100 is found (block 706), an update request is transmitted to the mobile communication network 10 (block 708) to provide the requested information. The mobile communication network 10 transmits the requested update to the mobile terminal 100 in response to the update request (block 710) and the mobile terminal 100 makes appropriate updates to the location database (block 712). The mobile terminal 100 then retrieves and displays the requested information (block 714) after the location database has been updated. The procedure ends (block 716) when the requested information is displayed.

As noted above, the location data may comprise references to pre-defined geographic areas. The pre-defined geographic areas may overlap one another, in whole or in part. Thus, it is possible that the geographic areas may be hierarchical in nature (e.g., country, state, county, city, campus, building, etc.). If so, then the mobile terminal 100 is confronted with the problem of determining which location specific information to output. In some embodiments, the mobile terminal 100 may simply display all the relevant location specific information associated with all matching geographic areas, without regard to conflicts between the information. However, when there is location specific information that conflicts, the mobile terminal 100 is preferably programmed to select between the competing location specific information items. For instance, the mobile terminal 100 may display the non-conflicting location specific information, but display the conflicting location specific information associated with the wholly contained geographic area (i.e., the county's information is prioritized over the state's). By way of example, the mobile terminal 100 may display the name of the state where the mobile terminal 100 is located, along with the name of the largest city of the county where the mobile terminal 100 is located and the local travel agency phone number, rather than the state-wide toll free number. Thus, the display 110 may display "North Carolina, Durham, travel=555-3456." Alternative methods of prioritizing the geographic areas may also be used, such as the relative longevity of the mobile terminal 100 in the geographic area, or the relative newness of the mobile terminal 100 to the geographic area, or lowest level only, etc. In other situations, the geographic areas may be peer level geographic areas that overlap. In such situations, the mobile terminal 100 should determine which geographic area to give priority to based on proximity to the center of the respective geographic areas, on user preferences, or some other criterion such as amount of time previously spent in one of the geographic areas. Alternatively, the mobile terminal 100 may sequentially output the location specific information for the respective overlapping or hierarchical geographic areas in a looping fashion, or prompt the user to select the appropriate geographic area of interest.

In another aspect of the invention, the current location of the mobile terminal 100 may be used to update location specific functions of the mobile terminal 100. By way of example, assume that the mobile terminal 100 pre-programmed buttons to automatically dial local authorities or local business of a specified type. The local authorities and local businesses will likely change when the user of the mobile terminal 100 travels between two geographic areas. According to the present invention, the mobile terminal 100 automatically reprograms location specific functions based on the current location of the mobile terminal 100 without intervention by the user. In the above example, the mobile terminal 100 would automatically re-program the number for local authorities or business whenever a change in location is detected.

Figure 8:
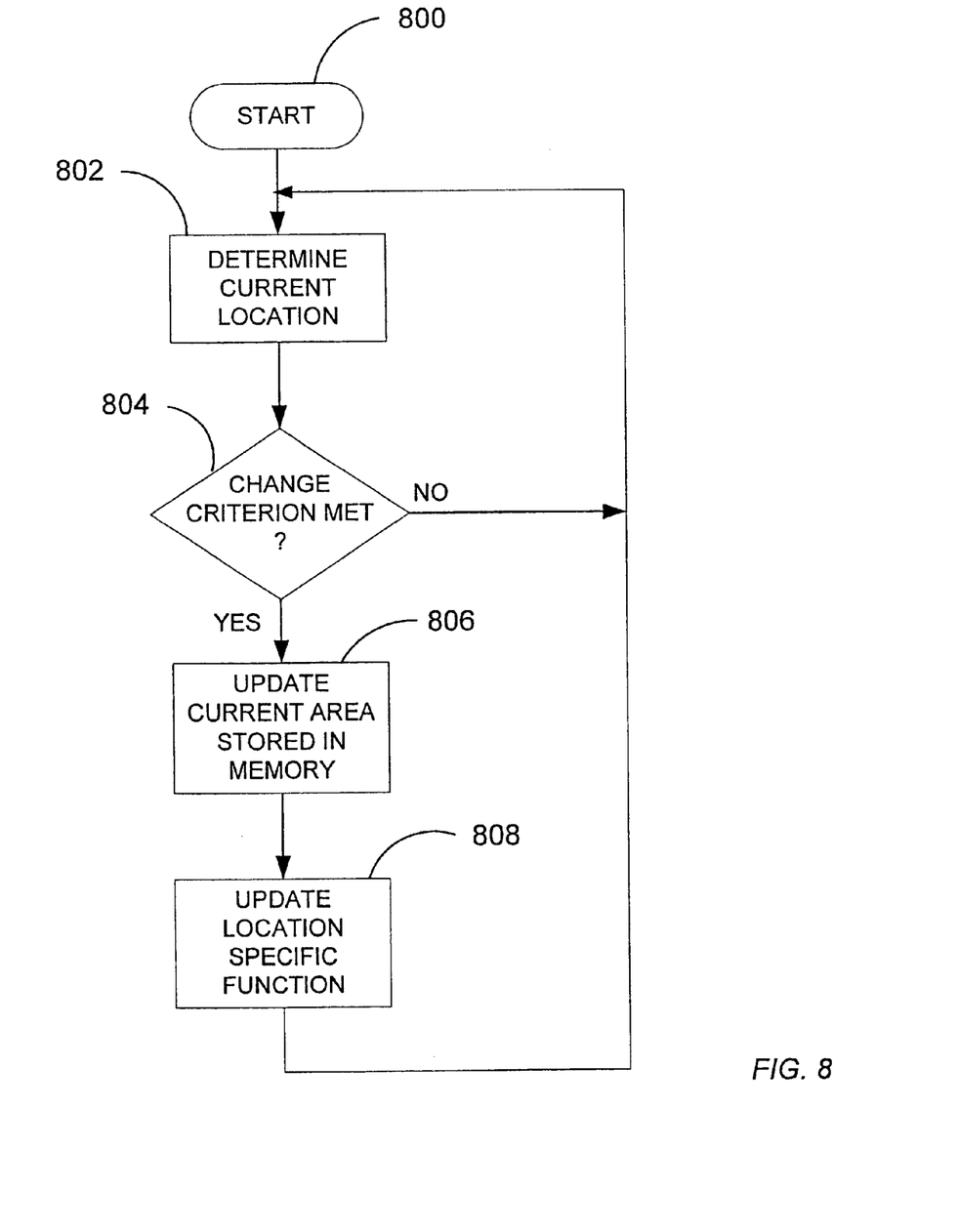
FIG. 8 is a flow diagram illustrating a procedure for automatically updating location specific functions of the mobile terminal.

FIG. 8 is a flow diagram illustrating an exemplary procedure for automatically reprogramming a location specific function. Once started (block 800), the update procedure starts (block 800) when the phone is first turned on or, alternatively, may be manually started by the user. Once started, the mobile terminal 100 periodically determines its current location (block 802). Each time the current location of the mobile terminal 100 is updated, the mobile terminal 100 determines whether a change in geographic areas has occurred (block 804). If so, the mobile terminal 100 updates the current area stored in memory (block 806) and updates location specific functions as needed (block 808). For example, if the location specific function is an emergency calling feature, the local emergency response numbers for each geographic area could be stored in the location database. When the user travels between two different geographic areas, the local emergency response numbers in the two areas are compared. If the numbers are different, the mobile terminal 100 would automatically reprogram the emergency call button to call the local emergency response number for the new geographic area.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of automatically reprogramming a location specific function of a mobile terminal, said method comprising:

storing a location database in said mobile terminal, said location database including location specific information and associated location data;

determining a current location of said mobile terminal;

comparing said current location of said mobile terminal with said location data to select location specific information stored in said location database; and automatically reprogramming a location specific function based on said selected location specific information.

2. The method of claim 1 wherein automatically reprogramming a location specific function based on said selected location specific information comprises reprogramming an autodial button.

* * * * *